(12) United States Patent
Merz

(10) Patent No.: US 8,756,808 B2
(45) Date of Patent: Jun. 24, 2014

(54) METHOD FOR PRODUCING A CELLULAR WHEEL

(75) Inventor: Karl Merz, Reinach (CH)

(73) Assignee: MEC Lasertec AG, Liembach (CH)

( * ) Notice: Subject to any disclaimer, the term of this patent is extended or adjusted under 35 U.S.C. 154(b) by 519 days.

(21) Appl. No.: 13/130,725

(22) PCT Filed: Sep. 8, 2009

(86) PCT No.: PCT/CH2009/000300
§ 371 (c)(1),
(2), (4) Date: Jun. 15, 2011

(87) PCT Pub. No.: WO2010/057319
PCT Pub. Date: May 27, 2010

(65) Prior Publication Data
US 2011/0239463 A1 Oct. 6, 2011

(30) Foreign Application Priority Data

Nov. 21, 2008 (EP) ...................................... 08020288
Apr. 27, 2009 (EP) ...................................... 09005819

(51) Int. Cl.
*B21K 25/00* (2006.01)
*B23P 15/04* (2006.01)

(52) U.S. Cl.
USPC .......................... 29/889.21; 29/889; 29/889.2

(58) Field of Classification Search
USPC ............ 29/889, 889.2, 889.21, 890, 890.045, 29/890.046; 165/8, 9, 10, 164, 169; 422/180
See application file for complete search history.

(56) References Cited

U.S. PATENT DOCUMENTS

| | | | | |
|---|---|---|---|---|
| 2,820,615 | A | * | 1/1958 | Peters ........................... 165/169 |
| 2,857,661 | A | | 10/1958 | Bruegger |
| 3,463,222 | A | * | 8/1969 | Grames ........................... 165/10 |

(Continued)

FOREIGN PATENT DOCUMENTS

| | | |
|---|---|---|
| CH | 405 837 | 7/1966 |
| DE | 937407 C | 1/1956 |
| DE | 10 2007 021 367 B4 | 12/2008 |
| DE | 10 2007 037 424 B4 | 6/2009 |

(Continued)

*Primary Examiner* — Richard Chang
(74) *Attorney, Agent, or Firm* — Sughrue Mion, PLLC

(57) ABSTRACT

In a method for producing a cellular wheel made of metal, the following steps are conducted consecutively: (a) providing a sheet metal strip (26) having a length (1) that corresponds at least to the length of a circumferential line of an intermediate sleeve and a width (b) that corresponds at least to the length of the cellular wheel; (b) placing disks (16) in predetermined locations in predetermined quantities on both sides of the sheet metal strip (26) perpendicular to the sheet metal surface and perpendicular to the longitudinal direction of the sheet metal strip (26) and connecting the disks (16) to the sheet metal strip (26) by welding or brazing; (c) bending the metal strip (26) equipped on both sides with the disks (16) and connecting the two ends of the sheet metal strip (26) by welding or brazing to form the intermediate sleeve; (d) placing a first tubular sleeve that is concentric to the intermediate sleeve as an outer sleeve, and a second tubular sleeve that is concentric to the intermediate sleeve as an inner sleeve, and connecting the free ends of the disks (16) to the outer sleeve or the inner sleeve by welding or brazing. The method allows cellular wheels to be produced which have material wall thicknesses of 0.2 mm and less for use in pressure wave superchargers.

10 Claims, 10 Drawing Sheets

(56) References Cited

U.S. PATENT DOCUMENTS

| | | | | |
|---|---|---|---|---|
| 3,958,626 | A | * | 5/1976 | Klein ................................ 165/8 |
| 4,136,729 | A | * | 1/1979 | Sakaki .............................. 165/9 |
| 5,110,561 | A | * | 5/1992 | Hitachi et al. ................. 422/180 |
| 6,991,023 | B2 | | 1/2006 | Berchowitz et al. |
| 8,474,515 | B2 | * | 7/2013 | Burgers et al. ................ 165/164 |

FOREIGN PATENT DOCUMENTS

| | | |
|---|---|---|
| GB | 693009 A | 6/1953 |
| GB | 920 624 | 3/1963 |
| GB | 920908 A | 3/1963 |
| GB | 1076235 A | 7/1967 |

* cited by examiner

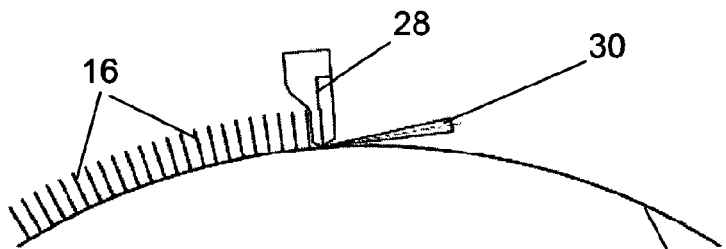
Fig. 9
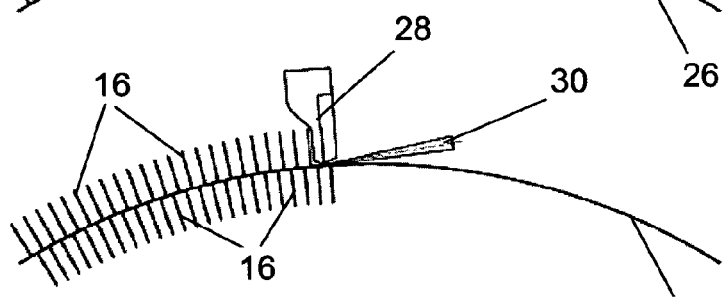
Fig. 10
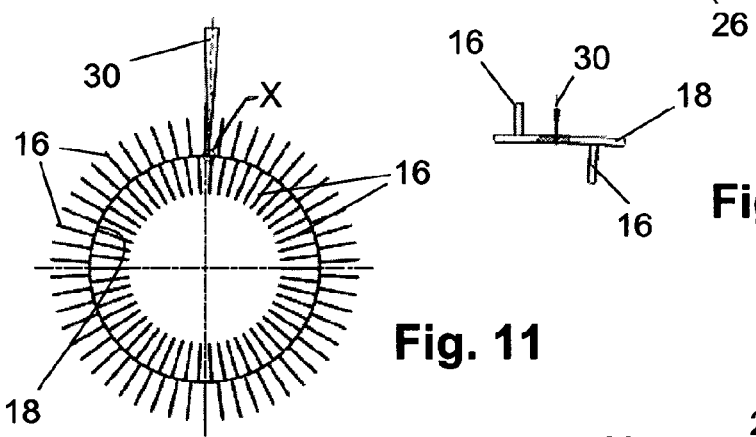
Fig. 12
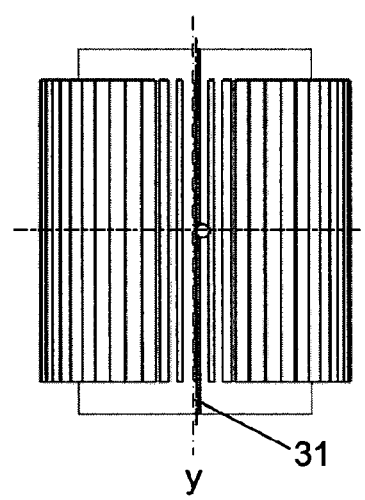
Fig. 11
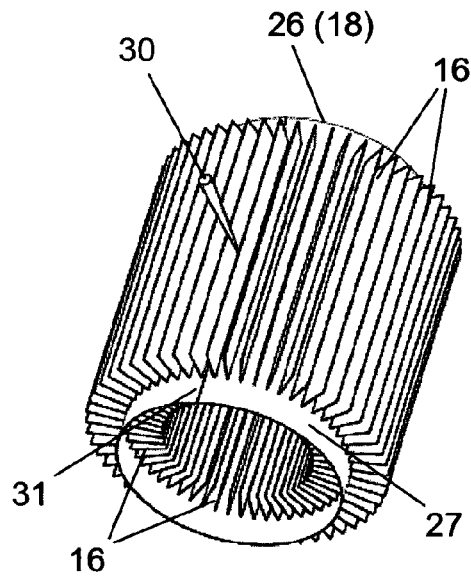
Fig. 13     Fig. 14

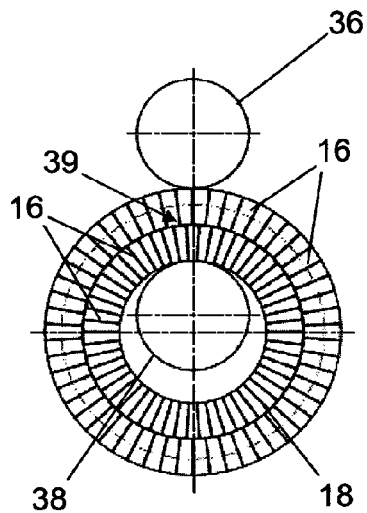
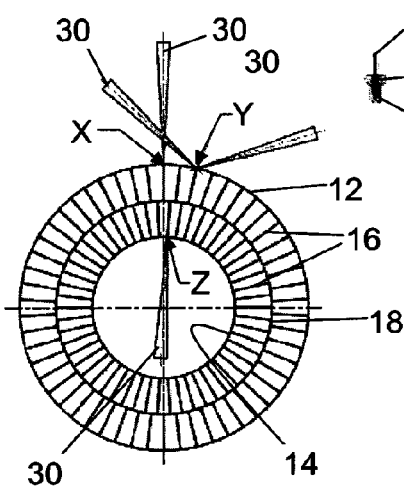
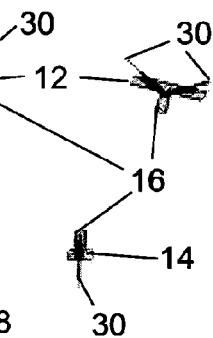
Fig. 19   Fig. 20   Fig. 21
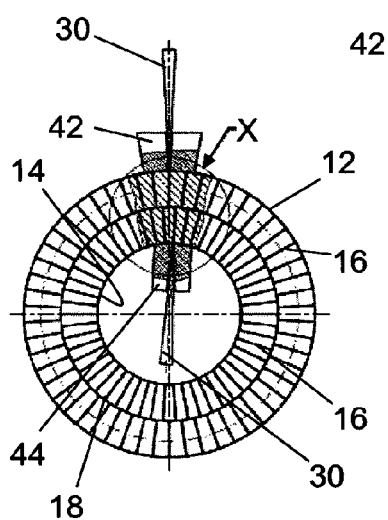
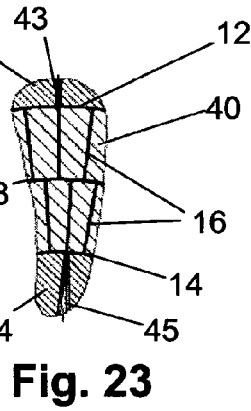
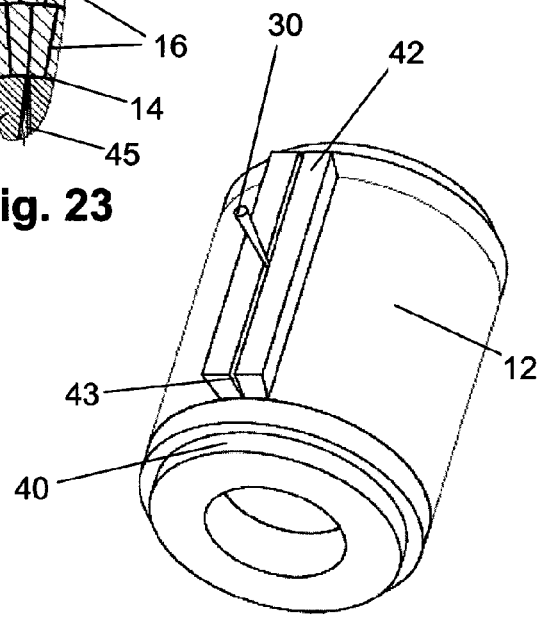
Fig. 22   Fig. 23   Fig. 24

METHOD FOR PRODUCING A CELLULAR WHEEL

CROSS REFERENCE TO RELATED APPLICATIONS

This application is a National Stage of International Application No. PCT/CH2009/000300 filed Sep. 8, 2009, which claims priority from European Patent Application Nos. 08020288.0 filed Nov. 21, 2008, and 09005819.9 filed Apr. 27, 2009, the contents of all of which are incorporated herein by reference in their entirety.

TECHNICAL SCOPE

The present invention relates to a method for producing a cellular wheel made of metal, having a cylindrical outer sleeve that lies symmetrically to an axis of rotation, a cylindrical inner sleeve that lies concentrically to the outer sleeve, where applicable arranged on a cylindrical flange sleeve, at least one cylindrical intermediate sleeve that is arranged between outer sleeve and inner sleeve concentrically to said sleeves, wherein lamellas that are aligned radially in relation to the axis of rotation are arranged between outer sleeve and intermediate sleeve and between intermediate sleeve and inner sleeve, as well as in the case of there being more than one intermediate sleeve between consecutive intermediate sleeves.

PRIOR ART

For some years the downsizing method has been ranked as one of the main subjects when designing new, supercharged engines. Downsizing allows the fuel consumption, and consequently the exhaust emissions of a vehicle, to be reduced. Nowadays these goals are becoming more and more important as high energy consumption using fossil fuels contributes greatly to air pollution and stricter and stricter environmental regulations force the vehicle manufacturer to act. The term downsizing refers to the substitution of a large-volume engine by an engine with a reduced cubic capacity. At the same time, the engine output is to be held constant by supercharging the engine. The aim is to achieve with small-volume engines output values that are identical to comparable aspirating engines. New discoveries in the area of downsizing have shown that the best results can be achieved with pressure wave supercharging, in particular in the case of very small gasoline engines with a cubic capacity of 1 liter or less.

In a pressure wave supercharger, the rotor is realized as a cellular wheel and is surrounded by an air and exhaust housing with a common outer casing. The development of modern pressure wave superchargers for supercharging small engines leads to cellular wheels with a diameter in the order of magnitude of 100 mm or less. To obtain a maximum cell volume and also to reduce weight, efforts are made to achieve cell wall thicknesses of 0.2 mm or less. At the high exhaust gas inlet temperatures of around 1000° C., in practice only high-temperature steels and alloys can be considered as materials for the cellular wheel. The production of dimensionally stable, highly accurate cellular wheels with a small cell wall thickness is still hardly possible today or, however, is connected to considerable extra costs.

It has already been proposed to form the chambers of a cell wall from Z-shaped profiles that have been arranged together in rows and overlap in part. The production of such a cellular wheel, however, is associated with considerable expenditure. To this must be added that the arranging together in rows and the positionally accurate fixing of Z-profiles can hardly be executed with an accuracy that is sufficient for retaining the required tolerances.

It has also already been proposed to produce a cellular wheel from a solid body by eroding the individual cells. However, it is not possible to achieve cell wall thicknesses of 0.2 mm using this method. The resultant high material and machining costs provide a further considerable disadvantage of the eroding method.

REPRESENTATION OF THE INVENTION

It is the object of the invention to produce a cellular wheel of the afore-mentioned type with the required accuracy in a simple, cost-efficient manner avoiding the disadvantages of the prior art. A further aim of the invention is the creation of a method for producing a cellular wheel suitable for use in a pressure wave supercharger for supercharging internal combustion engines, in particular for supercharging small gasoline engines with a cubic capacity in the order of magnitude of 1 liter or less. In particular, the method is to enable the cost-efficient production of dimensionally-stable, highly-accurate cellular wheels with a cell wall thickness of 0.2 mm or less.

A method characterized by the following steps which are to be executed consecutively leads to a first achievement of the object as claimed in the invention:

(a1) prepare a first sheet metal strip having a length that corresponds at least to the length of a circumferential line of the inner sleeve and having a width that corresponds at least to the length of the cellular wheel;

(b1) position the lamellas at predetermined locations in predetermined quantities on one side of the first sheet metal strip perpendicular to the sheet metal surface and perpendicular to the longitudinal direction of the first sheet metal strip and connect the lamellas to the first sheet metal strip by welding or soldering;

(c1) bend the first sheet metal strip provided on one side with the lamellas and connect the two ends of the sheet metal strip by welding or soldering to form the inner sleeve; or (a2) prepare a first sheet metal strip and connect the two ends of the first sheet metal strip by welding or soldering to form the inner sleeve, or prepare a tubular sleeve as inner sleeve;

(b2) position the lamellas at predetermined locations in predetermined quantities in axial planes on the outside of the inner sleeve;

(c2) connect the lamellas to the inner sleeve by welding or soldering;

(d1) prepare a second sheet metal strip having a length that corresponds at least to the length of a circumferential line of the first intermediate sleeve and having a width that corresponds at least to the length of the cellular wheel;

(e1) position the lamellas at predetermined locations in predetermined quantities on one side of the second sheet metal strip perpendicular to the surface of the metal strip and perpendicular to the longitudinal direction of the second sheet metal strip and connect the lamellas to the second sheet metal strip by welding or soldering;

(f1) bend the second sheet metal strip provided with lamellas on one side and connect the two ends of the second sheet metal strip by welding or soldering to form the first intermediate sleeve; or (d2) prepare a second sheet metal strip and connect the two ends of the second sheet metal strip by welding or soldering to form the first intermediate sleeve, or prepare a tubular sleeve as intermediate sleeve;

(e2) position the lamellas at predetermined locations in predetermined quantities in axial planes on the outside of the first intermediate sleeve;

(f2) connect the lamellas to the first intermediate sleeve by welding or soldering;

(g) position the first intermediate sleeve and connect the free ends of the lamellas of the inner sleeve to the first intermediate sleeve by welding or soldering;

(h) where applicable, repeat steps (d1)-(f1) or (d2)-(f2) to form at least one further intermediate sleeve and connect the free ends of the lamellas of the first intermediate sleeve to the second intermediate sleeve, and in the case of there being more than two intermediate sleeves connect the free ends of the lamellas of each preceding intermediate sleeve to the following intermediate sleeve by welding or soldering;

(i) position a tubular sleeve that is concentric to the intermediate sleeves as outer sleeve and connect the free ends of the lamellas of the outermost intermediate sleeve to the outer sleeve by welding or soldering.

The central concept of the first alternative of the method essential to the invention is that, in each case, a sheet metal strip to be bent to form a sleeve or a tubular sleeve are provided with the lamellas on one side. This means that when the cellular wheel is assembled, the lamellas of each preceding sleeve are positioned in a positionally accurate manner and are joined in each case to the following sleeve and are able to be radially aligned with simple means and connected to the outer sleeve to form the finished cellular wheel. The method also enables, in a simple manner, a connecting of the inner sleeve to a flange sleeve.

A method characterized by the following steps which are to be executed consecutively leads to a second achievement of the object as claimed in the invention:

(a) prepare a sheet metal strip having a length that corresponds at least to the length of a circumferential line of the intermediate sleeve and having a width that corresponds at least to the length of the cellular wheel;

(b) position the lamellas at predetermined locations in predetermined quantities on both sides of the sheet metal strip perpendicular to the sheet metal surface and perpendicular to the longitudinal direction of the sheet metal strip and connect the lamellas to the sheet metal strip by welding or soldering;

(c) bend the sheet metal strip provided on both sides with the lamellas and connect the two ends of the sheet metal strip by welding or soldering to form the inner sleeve;

(d) position a first tubular sleeve that is concentric to the intermediate sleeve as outer sleeve and a second tubular sleeve that is concentric to the intermediate sleeve as inner sleeve and connect the free ends of the lamellas to the outer sleeve or the inner sleeve.

The central concept of the second alternative of the method essential to the invention is that a sheet metal strip is provided with the lamellas on two sides and subsequently the two ends of the sheet metal strip are connected. This means that all the lamellas on one side are already positioned and joined in a positionally accurate manner and are able to be radially aligned with simple means and connected to the outer sleeve or inner sleeve to form the finished cellular wheel.

The connecting of the lamellas to the sheet metal strips, to the outer sleeve, to the inner sleeve and/or to the intermediate sleeve is preferably carried out by welding the parts by means of a laser or electron beam.

However, the connecting of the lamellas to the sheet metal strip, to the outer sleeve, to the inner sleeve and/or to the intermediate sleeve can also be carried out by soldering the parts via a soldering lug in the form of a folded-over edge strip, which extends over the length of the lamellas and is coated by a solder.

Prior to positioning the outer sleeve, the inner sleeve and the intermediate sleeve/sleeves, it can be necessary to remove the free ends of the lamellas by means of grinding rolls until the free ends of the lamellas are lying on a lateral cylinder surface that corresponds to the inside of the outer sleeve or the outside of the inner sleeve.

A method characterized by the following steps which are to be executed consecutively leads to a third achievement of the object as claimed in the invention, with a cylindrical inner sleeve that is arranged on a cylindrical flange sleeve:

(a) prepare a first sheet metal strip having a length that corresponds at least to the length of a circumferential line of the inner sleeve and having a width that corresponds at least to the length of the cellular wheel;

(b) position the lamellas at predetermined locations in predetermined quantities on one side of the first sheet metal strip perpendicular to the sheet metal surface and perpendicular to the longitudinal direction of the first sheet metal strip and connect the lamellas to the first sheet metal strip by welding or soldering;

(c) connect a first end of the first sheet metal strip provided with the lamellas on one side to the flange sleeve by welding or soldering, roll up the first sheet metal strip onto the flange sleeve, wherein, proceeding from the first end connected to the flange sleeve, the first sheet metal strip is connected at regular intervals to the flange sleeve by welding or soldering to form the inner sleeve;

(d) prepare a second sheet metal strip having a length that corresponds at least to the length of a circumferential line of the first intermediate sleeve and having a width that corresponds at least to the length of the cellular wheel;

(e) position the lamellas at predetermined locations in predetermined quantities on one side of the second sheet metal strip perpendicular to the sheet metal surface and perpendicular to the longitudinal direction of the second sheet metal strip and connect the lamellas to the second sheet metal strip by welding or soldering;

(f) connect a first end of the second sheet metal strip provided with the lamellas on one side to a free end of a first lamella of the first sheet metal strip forming the inner sleeve by welding or soldering, roll up the second sheet metal strip onto the free ends of the lamellas of the inner sleeve, wherein, proceeding from the first end connected to the free end of the first lamella of the inner sleeve, the second sheet metal strip is connected at regular intervals to the free ends of the lamellas of the inner sleeve by welding or soldering to form the first intermediate sleeve;

(g) where applicable, repeat steps (d)-(f) to form at least one further intermediate sleeve and connect the free ends of the lamellas of the first intermediate sleeve to the second intermediate sleeve, and in the case of there being more than two intermediate sleeves connect the free ends of the lamellas of each preceding intermediate sleeve to the following intermediate sleeve by welding or soldering;

(h) prepare a third sheet metal strip having a length that corresponds at least to the length of a circumferential line of the outer sleeve and having a width that corresponds at least to the length of the cellular wheel;

(i) connect a first end of the third sheet metal strip to a free end of a first lamella of the first sheet metal strip forming the outermost intermediate sleeve by welding or soldering, roll up the third sheet metal strip onto the free ends of the lamellas of the outermost intermediate sleeve, wherein, proceeding from the first end connected to the free end of the first lamella of the outermost intermediate sleeve, the third sheet metal strip is connected at regular intervals to the free ends of the lamellas of the outermost intermediate sleeve by welding or soldering to form the outer sleeve.

The central concept of the third alternative of the method essential to the invention is that the sheet metal strip is fixed with one end on the flange sleeve or on the free end of a first lamella of a sheet metal strip lying below it and the sheet metal strip is rolled up and connected step-by-step to the surface underneath. This means that the tensile stresses, which occur in the sheet metal strips when the free ends of the lamellas are welded to the sheet metal strips and which lead finally to a distortion within the cellular wheel and, as a result, to inadmissible deformation of the cellular wheel, are reduced in a considerable manner.

The positioning of the lamellas on the sheet metal strips or the tubular sleeves is preferably carried out by means of a numerically-controlled clamping device.

The sheet metal strip for the positioning of the lamellas and connecting to the sheet metal strip can be tensioned in a curved manner, wherein the positioning of the lamellas is carried out on the side of the sheet metal strip with the convex curvature.

The wall thickness of the materials used to produce the cellular wheel is preferably less than 0.5 mm, in particular less than 0.3 mm and in particular a maximum of 0.2 mm.

The cellular wheel produced using the method as claimed in the invention is preferably used in a pressure wave supercharger for supercharging internal combustion engines, in particular gasoline engines with a cubic capacity of 1 liter or less.

BRIEF DESCRIPTION OF THE DRAWING

Further advantages, features and details of the invention are produced from the following description of preferred exemplary embodiments as well as by way of the drawing, which serves purely for explanation and is not to be seen as restrictive. In the drawing:

FIG. 9 shows a schematic representation of an arrangement corresponding to FIG. 6 with a curved sheet metal strip;

FIG. 10 shows a schematic representation of an arrangement corresponding to FIG. 7 with a curved sheet metal strip;

FIG. 11 shows a schematic representation of the front view of a sheet metal strip provided on both sides with lamellas and welded to form an intermediate sleeve;

FIG. 12 shows a schematic representation of an enlarged detail of the region X in FIG. 11;

FIG. 13 shows a schematic representation of a top view onto the arrangement in FIG. 11;

FIG. 14 shows a schematic representation of an inclined view onto the arrangement in FIG. 11;

FIG. 19 shows a schematic representation of an arrangement corresponding to FIG. 11 with a tool inserted and grinding rolls positioned;

FIG. 20 shows a schematic representation of the arrangement shown in FIG. 11 with inner and outer sleeve inserted when welding-on the lamellas;

FIG. 21 shows a schematic representation of enlarged details of the regions X, Y, Z in FIG. 20 with a differently executed weld seam;

FIG. 22 shows a schematic representation of the arrangement shown in FIG. 21 with a tool inserted and a holding-down device placed in position;

FIG. 23 shows a schematic representation of an enlarged detail of the region X in FIG. 22;

FIG. 24 shows a schematic representation of an inclined view onto the arrangement in FIG. 22;

FIG. 37 shows a schematic representation of a longitudinal section through the arrangement in FIG. 33 with a tool inserted and an intermediate sleeve slipped on;

FIG. 38 shows an enlarged schematic representation of a cross section through part of the arrangement in FIG. 37 according to the line B-B;

FIG. 40 shows a schematic representation of the cross section in FIG. 39 with the second intermediate sleeve slipped-on;

DESCRIPTION OF PREFERRED EXEMPLARY EMBODIMENTS

Figure 1:
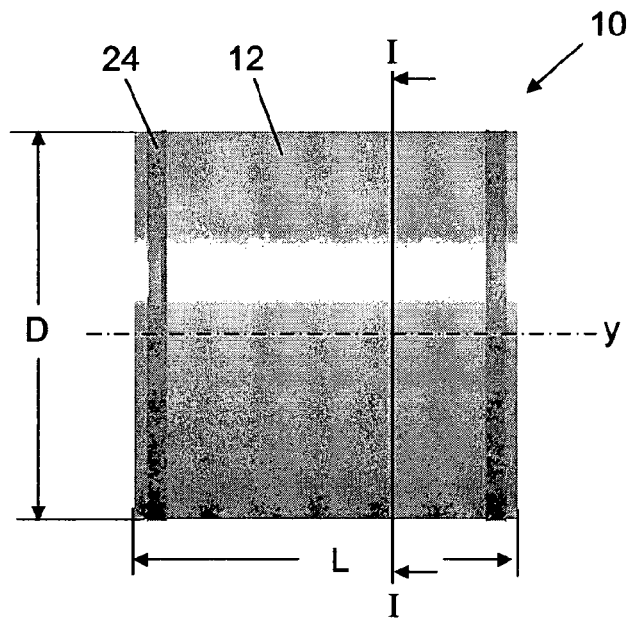
FIG. 1 shows a schematic representation of a side view of a cellular wheel for a pressure wave supercharger.
Figure 2:
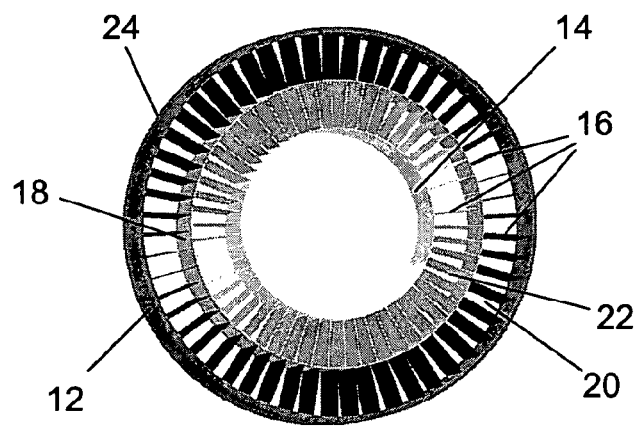
FIG. 2 shows a schematic representation of an inclined view onto the end face of the cellular wheel in FIG. 1.
Figure 3:
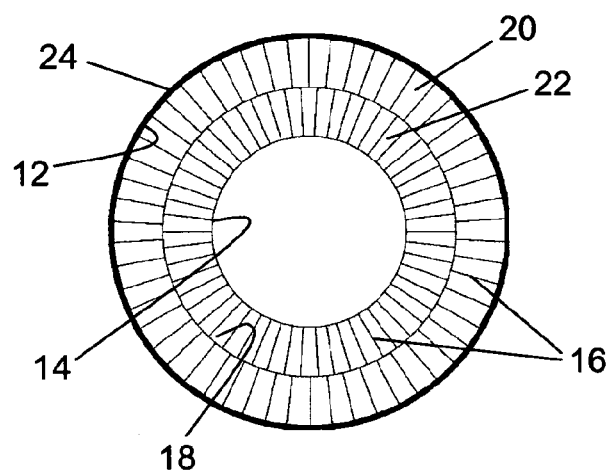
FIG. 3 shows a schematic representation of a section perpendicular to the axis of rotation of the cellular wheel in FIG. 1 according to the line I-I.

A cellular wheel 10, shown in FIGS. 1 to 3, of a pressure wave supercharger not shown in the drawing comprises a cylindrical outer sleeve 12 that lies symmetrically to an axis of rotation y of the cellular wheel 10, a cylindrical inner sleeve 14 that lies concentrically to the outer sleeve 12 and a cylindrical intermediate sleeve 18 that is arranged between the outer sleeve 12 and the inner sleeve 14 concentrically to said sleeves. The outer ring-shaped space between the intermediate sleeve 18 and the outer sleeve 12 and the inner ring-shaped space between the intermediate sleeve 18 and the inner sleeve 14 are subdivided by planar, strip-shaped lamellas 16, lying radially in relation to the axis of rotation y, into a plurality of outer cells 20 and inner cells 22 that are arranged in a rotationally offset manner in relation to said outer cells. The cellular wheel 10, shown as an example, having a diameter D and a length L each of, for example, 100 mm has 54 outer cells 20 and 54 inner cells 22. The outer sleeve 12, the intermediate sleeve 18, the inner sleeve 14 and the lamellas 16 have a uniform wall thickness of, for example, 0.2 mm and are produced from a high-temperature metallic material, for example Inconel 2.4856. The named parts have, in the direction of the axis of rotation y, an identical length L corresponding to the length of the cellular wheel 10 and extend between two end faces of the cellular wheel 10 that stand perpendicular to the axis of rotation y. Circumferential profiles 24 of a labyrinth seal are arranged on the outer sleeve 12 in the region of the two end faces. The counter profiles to the profiles 24 necessary for forming the labyrinth seal are situated on the inner wall of a cellular wheel housing (not shown in the drawing) provided for the bearing arrangement of the cellular wheel 10.

The production of a cellular wheel is explained in more detail in the following description of exemplary embodiments.

Figure 4:
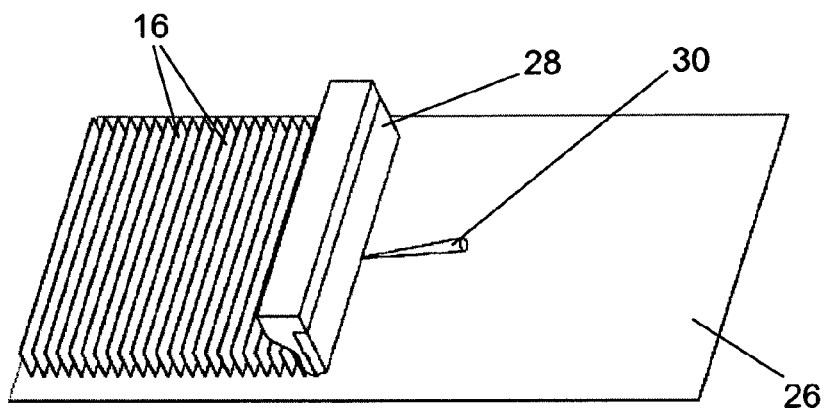
FIG. 4 shows a schematic representation of an inclined view onto a planar sheet metal strip with lamellas secured thereon.
Figure 5:
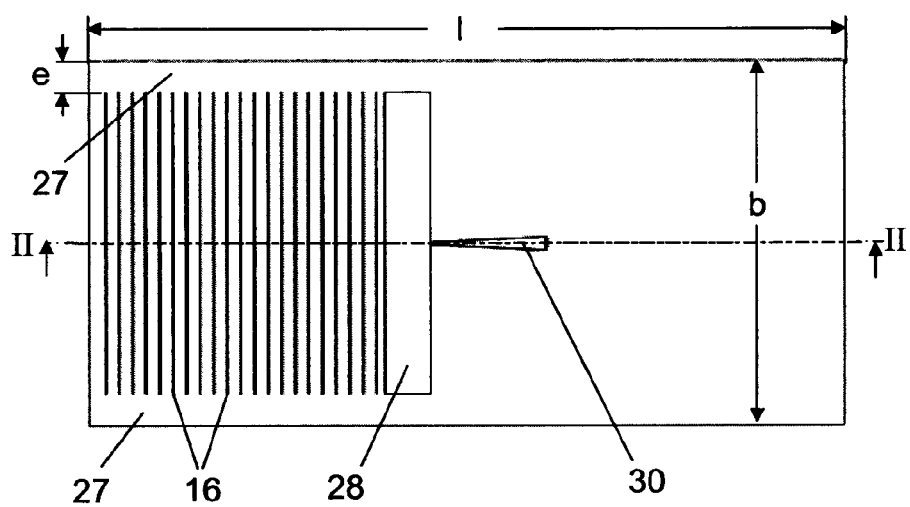
FIG. 5 shows a schematic representation of a top view onto the lamella arrangement shown in FIG. 4.
Figure 6:
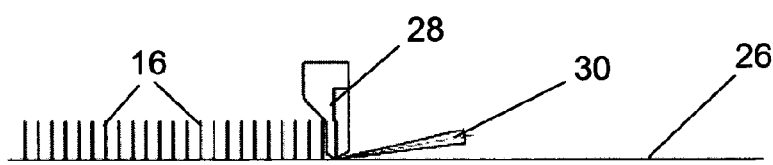
FIG. 6 shows a schematic representation of a section through FIG. 5 according to the line II-II.
Figure 7:
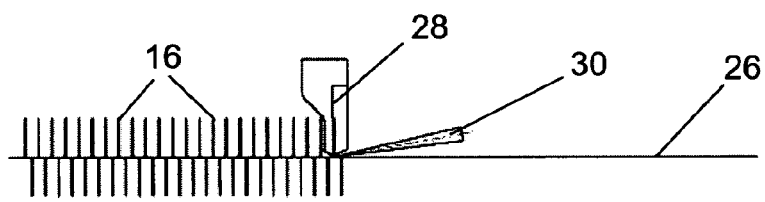
FIG. 7 shows a schematic representation of the arrangement in FIG. 6 with lamellas arranged on both sides of the sheet metal strip.

As can be seen in FIGS. 4 to 6, a sheet metal strip 26 having a length l and a width b is clamped in a planar manner on a tool table (not shown in the drawing). Lamellas 16 are then positioned individually, parallel to each other, at a predetermined mutual spacing perpendicular to the plane of the sheet metal strip 26 on the sheet metal strip 26 by tongs 28 by means of a numerically-controlled control means, are pressed against said sheet metal strip and, in this fixed position, are welded to the contact strip 26 along the contact line of the lamellas 16 with the surface of the sheet metal strip 26 by means of a laser beam 30 that is guided along the contact line. The number of lamellas 16 parallel to each other and their position on the sheet metal strip 26 correspond to the arrangement of the lamellas 16 between the intermediate sleeve 18 and the outer sleeve 12 of the cellular wheel 10. As can be seen in FIG. 5, the lamellas 16, arranged in rows one behind another in the longitudinal direction of the sheet metal strip 26, do not extend over the entire width b of the sheet metal strip 26, but leave a free edge strip 27 on both sides with an oversize e of, for example, 5 mm. Once one side has been provided with the predetermined number of lamellas 16 (FIG. 6), the sheet metal strip 26 is turned on the tool table and, as described above, the surface of the sheet metal strip 26 that is still free is provided with lamellas 16 (FIG. 7). The number of lamellas 16 and their position on the sheet metal strip 26 now correspond to the arrangement of the lamellas 16 between the intermediate sleeve 18 and the inner sleeve 14 of the cellular wheel 10.

Prior to the positioning, the lamellas 16 are usually cut to the predetermined length from a sheet metal strip that is present as a roll.

Figure 8:
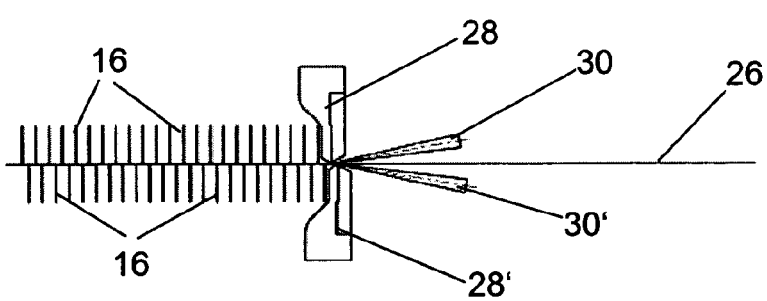
FIG. 8 shows a schematic representation of an arrangement corresponding to FIG. 6 with lamellas positioned on both sides of the sheet metal strip at the same time.

In the case of a variant of the method represented in FIG. 8, the lamellas 16 are positioned on two sides of the sheet metal strip 26 at the same time using two tongs 28, 28' and are welded to the sheet metal strip at the same time each by means of a numerically-controlled laser beam 30, 30'.

In the case of a further variant, reproduced in FIGS. 9 and 10, of the method represented in FIGS. 6 and 7, the sheet metal strip 26 is clamped on the tool table with a curvature. The positioning of the lamellas 16 on the sheet metal strip 26 is effected on the convexly curved surface. The curvature of the sheet metal strip 26 produces improved access of the laser beam 30 to the contact line to be welded between sheet metal strip 26 and lamella 16 as well as greater freedom when guiding the laser beam 30. Once the sheet metal strip 26 has been provided with the predetermined number of lamellas 16, the sheet metal strip 26, provided on one side with the lamellas 16, is turned on the tool table and once again is fixed with a curvature on the tool table, the already positioned lamellas 16 now being situated on the concave side of the curvature. The positioning of the predetermined number of lamellas 16 on the free, now convexly curved side of the sheet metal strip 26 is then effected, as described above.

The sheet metal strip 26 provided on both sides with lamellas 16 is then, as shown in FIGS. 11 to 14, curved over a mandrel to form a cylinder shape. In this case, the free edges of the sheet metal strip 26, possibly cut to size beforehand, meet each other in a butted manner and are welded in this position by means of a laser beam 30 guided along the butt edge to form a longitudinal weld seam 31. The welded sheet metal strip 26, curved to form a cylinder shape, corresponds to the intermediate sleeve 18 of the cellular wheel 10.

Before the welding operation is carried out, the sheet metal strip 26, curved to form a cylinder shape, with lamellas 16 that protrude inward and outward, is held and fixed at the outer periphery by three holders 32. The holders 32, distributed over the periphery, are provided with slots 33 that correspond to the predetermined angular position of the lamellas 16, into which slots the lamellas 16 penetrate by way of their free end when the holders 32 are placed in position and through the tapering slots 33 are slightly aligned, where necessary, and fixed in the correct position. The lamellas 16, protruding inward from the cylindrical intermediate sleeve 18, are fixed via tools 34 introduced at the end face having a cylindrical cross section with slots directed radially inward from the cylinder outer lateral surface and, where applicable, tapering and corresponding to the predetermined angular position of the lamellas 16.

Figure 15:
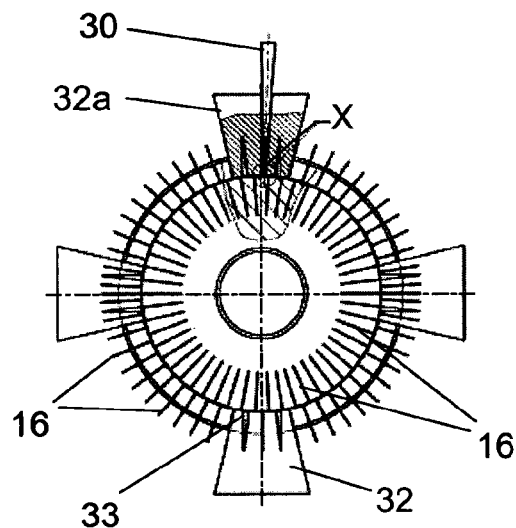
FIG. 15 shows a schematic representation of a representation corresponding to FIG. 11 with holders placed in position and a tool inserted.
Figure 16:
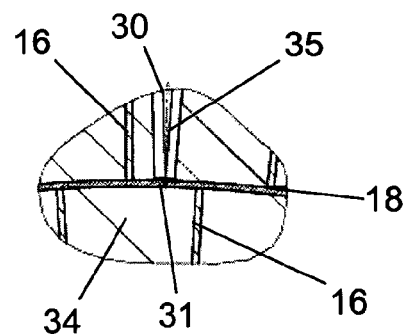
FIG. 16 shows a schematic representation of an enlarged detail of the region X in FIG. 15.
Figure 17:
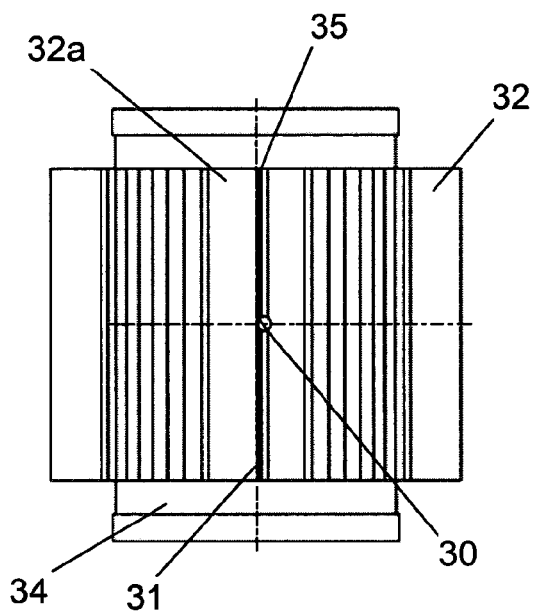
FIG. 17 shows a schematic representation of a top view onto the arrangement in FIG. 15.
Figure 18:
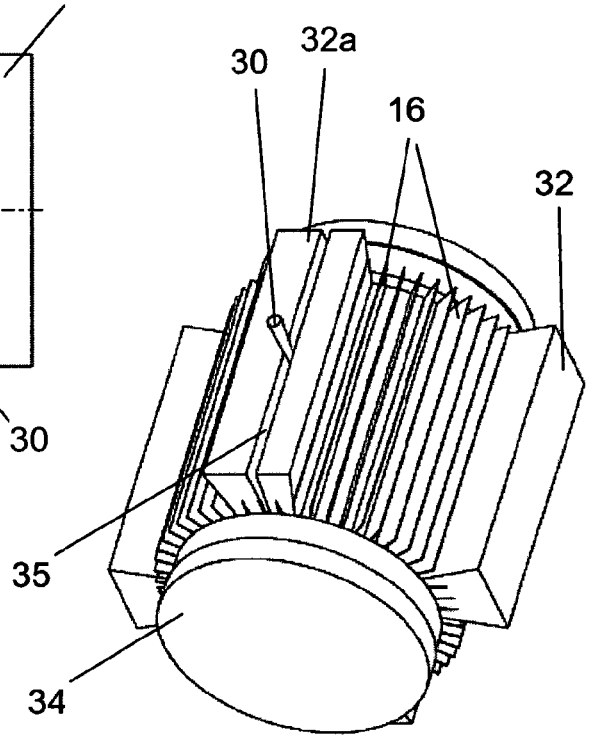
FIG. 18 shows a schematic representation of an inclined view onto the arrangement in FIG. 15.

The holder 32a, arranged in the region of the weld seam to be formed, as can be seen in FIGS. 15 and 16, is developed in two parts with a tapering, radially aligned gap 35 for the laser beam 30 and serves at the same time as a holding-down device for pressing the sheet metal strip 26 on both sides of the weld seam to be formed against the tool 34 that is supported from the inside. The ends of the sheet metal strip 26, fixed in this manner and aligned with each other at their butt edges, are now welded by means of a laser beam 30, guided along the butt edges, to form a longitudinal weld seam 31.

To meet the highest demands it can be necessary, prior to positioning the outer sleeve 12 and the inner sleeve 14, to remove the free ends of the lamellas 16 by way of an outer grinding roll 36 and an inner grinding roll 38 such that said free ends of the lamellas lie on a cylinder lateral surface that corresponds to the inside of the outer sleeve 12 or the outside of the inner sleeve 14. The two grinding rolls 36, 38 are arranged parallel to each other and at a fixed spacing from each other. During the grinding operation, the two grinding rolls 36, 38 rotate in opposite directions of rotation and form a grinding gap 39. The sheet metal strip 26, welded to form the cylindrical intermediate sleeve 18 with the lamellas 16 protruding on both sides, rotates in opposition to the rotary movement of the two grinding rolls 36, 38 in the grinding roll gap 39. This means that the outward protruding lamellas 16 are machined by the outer grinding roll 36 and the inward protruding lamellas 16 are machined by the inner grinding roll 38, the axes of the grinding rolls 36, 38 and the axis of rotation y of the cellular wheel 10 lie parallel to each other in a common plane. During said grinding operation, the lamellas 16 are fixed in their predetermined position. For this purpose, a tool 40, in the form of a hollow cylinder with slots directed radially inward from the cylinder inner and outer wall and, where applicable, tapering and corresponding to the predetermined angular position of the lamellas 16, engages from one side for accommodating and fixing the lamellas 16 (see FIGS. 22 to 24). The lamellas 16, in relation to the inner and outer lateral surface of the tool 40, have a smaller oversize, which is removed during the grinding process until the free end edges of the lamellas 16 align with the inner and outer lateral surface of the tool 40.

In a next step, represented in FIGS. 20 to 24, the outer sleeve 12 and the inner sleeve 14 in the form of tubular sleeves are slipped on or in from one end face and are placed in position onto the outer or inner lateral surface of the tool 40 and consequently also onto the free ends of the lamellas 16 fixed in the tool 40. Once the outer sleeve 12 and the inner sleeve 14 are positioned, the free ends of the lamellas 16 are welded along the butt edges to the outer sleeve 12 or the inner sleeve 14 by means of a laser beam 30 guided along each of the butt edges. Usually the laser beam is guided perpendicular to the surface of the outer or inner sleeve 12, 14 and penetrates in the radial direction over the butt edge into the radially aligned lamella 16. This is represented in FIGS. 20 and 21 by the welds at X and Z as well as in FIGS. 22 to 24. In the case of a weld variant Y, two laser beams 30, 30' are directed against each other from opposite sides at an acute angle to the surface of the outer sleeve 12 and right through said outer sleeve into the free end of the lamella 16 abutting against the outer sleeve 12 via a butt edge. As can be seen in FIGS. 22 to 24, two-part holding-down devices 42, 44 are used to carry out the welds, pressing down the outer sleeve 12 or the inner sleeve 14 on both sides of the weld seam to be formed and consequently ensuring good surface contact with the butt edge of the lamella 16. The holding-down devices are provided with a central tapering gap 43, 45 aligned radially to the axis of rotation y for the laser beam 30.

Figure 26:
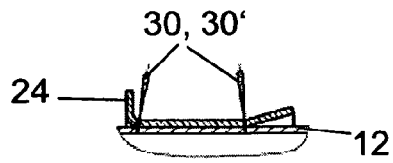
FIG. 26 shows a schematic representation of a cross section of an enlarged detail (region X) of the labyrinth seal shown in FIG. 25.
Figure 25:
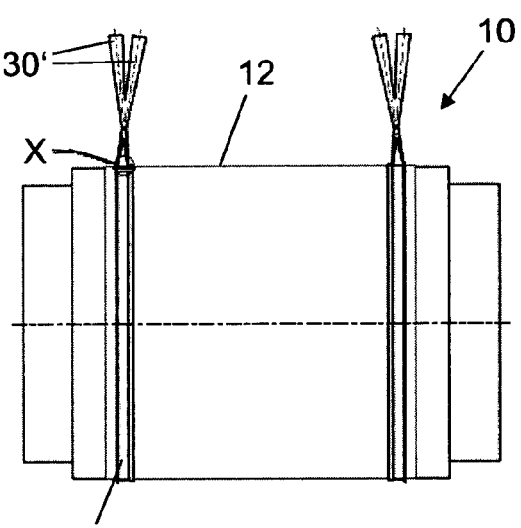
FIG. 25 shows a schematic representation of a side view of the cellular wheel in FIG. 20 with a welded-on labyrinth seal.

FIGS. 25 and 26 show an exemplary embodiment for profiles 24 of a labyrinth seal, said profiles being arranged circumferentially in a ring-shaped manner on the outer sleeve 12 in the region of the two end faces of the finished cellular wheel 10. The profile 24 is connected to the outer sleeve 12 via two circumferential weld seams provided by means of two laser beams 30, 30'.

Figure 27:
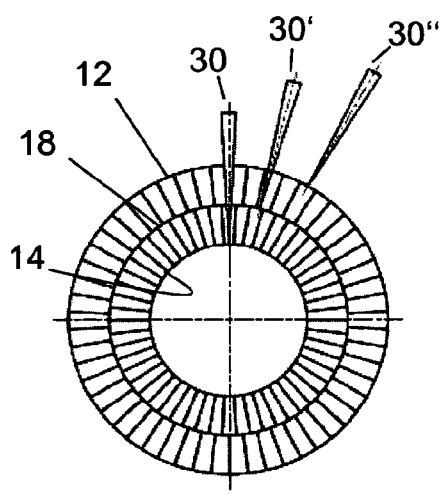
FIG. 27 shows a schematic representation of an end view onto a cellular wheel when trimming to size.
Figure 28:
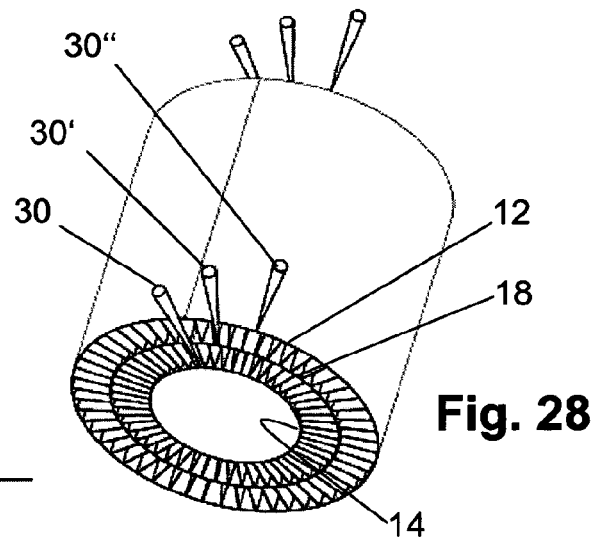
FIG. 28 shows a schematic representation of an inclined view onto the arrangement in FIG. 27.

In the case of the above-described production of a cellular wheel 10, outer sleeve 12, inner sleeve 14 and sheet metal strip 26 or intermediate sleeve 18 are usually used with an oversize. In the case of a finishing process represented in FIGS. 27 and 28, edges protruding at the two end faces of the cellular wheel 10 are separated from the rotating cellular wheel 10 by means of laser beams 30, 30', 30" for generating planar end surfaces.

The above-described lamellas 16 are strip-shaped, planar sheet metal parts, which stand via a butt edge perpendicularly on a cylinder lateral surface to be welded to the lamella 16. A laser beam is guided in a linear manner along the butt edge for connecting the two parts.

Figure 29:
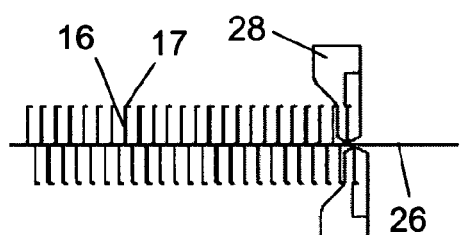
FIG. 29 shows a schematic representation of an arrangement corresponding to FIG. 8 with lamellas with welding or soldering lugs.
Figure 30:
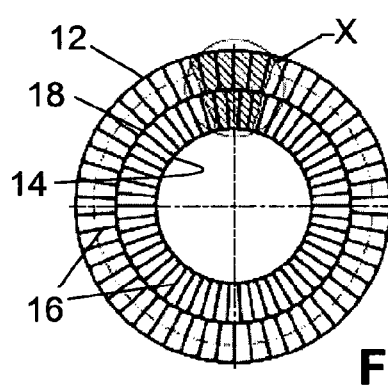
FIG. 30 shows a schematic representation of an arrangement corresponding to FIG. 22 with lamellas with welding or soldering lugs.
Figure 31:
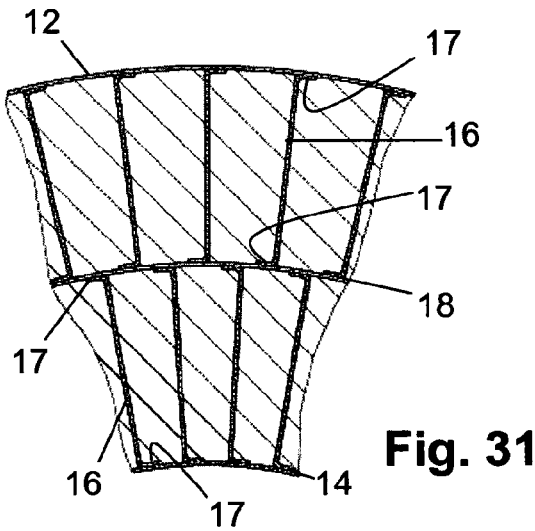
FIG. 31 shows a schematic representation of an enlarged detail of the region X in FIG. 30.

In FIGS. 29 to 31 a variant of the above-described production of a cellular wheel 10 is described. In place of strip-shaped, planar sheet metal parts, lamellas 16 are used, where at least one of the longitudinal edges is bent around out of the planar lamella surface by an angle of approximately 90° to form an edge-standing, strip-shaped welding or soldering lug 17 with a width of approximately 3 mm. The lamellas 16 with one or two welding or soldering lugs 17 can, as described above, be connected to the sheet metal part 26, to the outer sleeve 12 and to the inner sleeve 14 by means of laser or electron beam welding via the welding or soldering lugs 17. However, the lamellas 16 can also be soldered to the named parts. To this end, the sheet metal strip provided for producing the lamellas 16 in the form of a roll is provided in the edge region with a strip solder. Once the lamellas 16 have been cut to length, the edge strip coated with solder is bent around to form the soldering lugs 17. As shown above by way of laser welds, a sheet metal strip 26 is also provided first of all with the lamellas 16 even where soldered cellular wheels 10 are produced, wherein as each lamella 16 is positioned by means of the tongs 28, soldering to the sheet metal strip 26 is carried out at the same time through short-time, rapid heating-up of the soldering lugs 17 above the solidus temperature of the solder for example by means of an inductive heating device. The soldering of the soldering lugs 17 to the outer sleeve 12 and to the inner sleeve 14 can be carried out in a furnace, e.g. in a continuous strip annealing furnace, once the lamellas 16 have been aligned in the correct position. It is also conceivable to connect the lamellas 16 initially to the sheet metal strip 26 by means of laser or electron beam welding, it being possible to develop the free end of the lamellas 16 to be connected to the sheet metal strip 26 with or without welding lug 17, and then to carry out the free end of the lamellas 16 to be connected to the outer sleeve 12 and to the inner sleeve 14 by means of a soldering lug 17 coated with solder.

In FIGS. 32 to 41 a further variant of the above-described production of a cellular wheel 10 is described. The essential difference to the type of production described previously is that the sheet metal strip 26 is only provided with the lamellas 16 on one side and is subsequently curved to form a cylinder shape, it also being possible to provide a previously produced sleeve with the lamellas 16.

Figure 32:
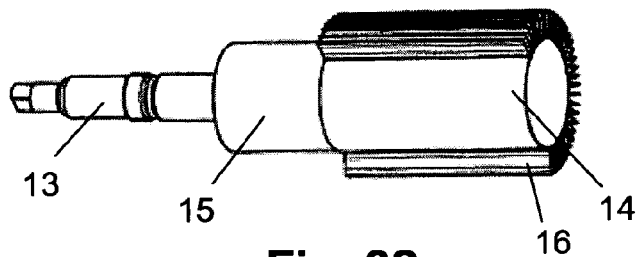
FIG. 32 shows a schematic representation of an inclined view onto an inner sleeve of a cellular wheel with part of the lamellas positioned and joined.
Figure 34:
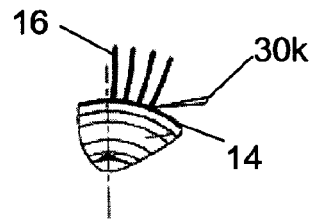
FIG. 34 shows an enlarged schematic representation of a section through a part region of the arrangement in FIG. 32 at right angles to the axis of the cellular wheel.

FIG. 32 and FIG. 34 show the provision of a prefabricated inner sleeve 14 with the lamellas 16. In this case, the lamellas 16 are positioned one after the other and are joined to the inner sleeve 14 via a fillet weld produced by a laser beam 30k. The inner sleeve 14 can be a seamless sleeve or a sheet metal strip 26 curved to form a tubular sleeve and welded along a butt edge to form a longitudinal weld seam.

Figure 35:
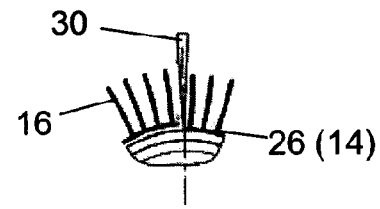
FIG. 35 shows an enlarged schematic representation of a first section through a part region of the arrangement in FIG. 33 at right angles to the axis of the cellular wheel.
Figure 36:
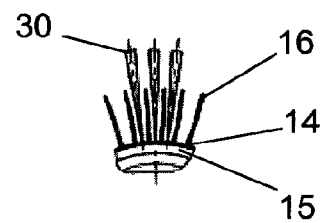
FIG. 36 shows an enlarged schematic representation of a second section through a part region of the cellular wheel in FIG. 33 at right angles to the axis of the cellular wheel.

It is also possible for a sheet metal strip 26 to be provided initially with the lamellas 16 on one side, then curved to form a cylinder shape and to be welded to the inner sleeve 14 at the butt edges (FIG. 35).

As can be seen in FIG. 32, the inner sleeve 14 provided with the lamellas 16 is slipped onto a flange sleeve 15 that is connected to a drive shaft 13.

Figure 33:
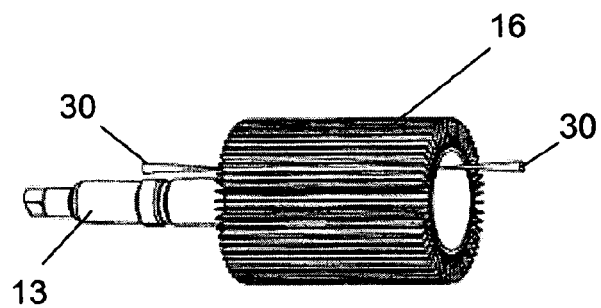
FIG. 33 shows a schematic representation of an inclined view onto an arrangement corresponding to FIG. 32 during the welding to a flange sleeve.

In FIG. 33, the connection between the inner sleeve 14 and the flange sleeve 15 is effected by welding the end edges of inner sleeve 14 and flange sleeve 15 by means of laser beams 30. In the case of the type of connection shown in FIG. 36, the inner sleeve 14 is connected to the flange sleeve 15 by means of a laser beam 30 to form a blind seam, in each case between adjacent lamellas 16.

FIGS. 37 to 41 show the structure of a cellular wheel with two and more intermediate sleeves 18.

Figures 37, 38:
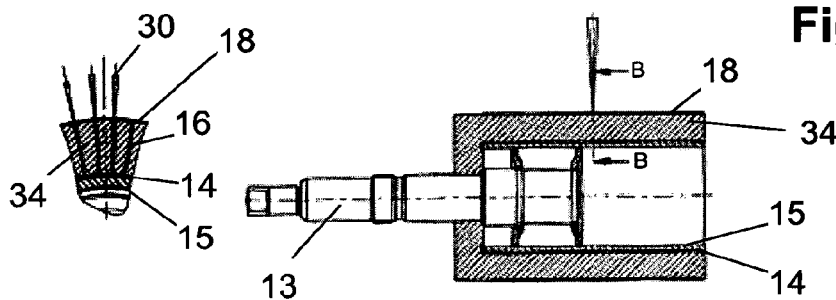
Figure 39:
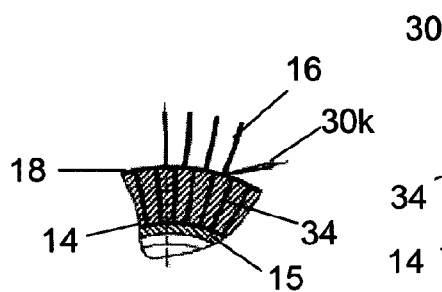
FIG. 39 shows a schematic representation of the cross section in FIG. 38 once further lamellas have been positioned and joined.
Figure 40:
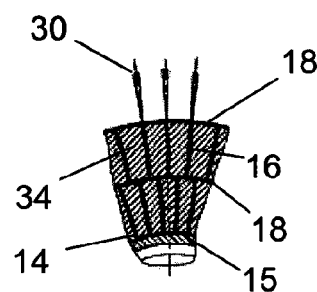
Figure 41:
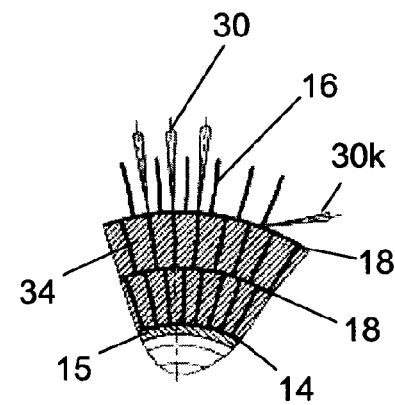
FIG. 41 shows a schematic representation of the cross section in FIG. 40 once further lamellas have been positioned and joined.

As shown in FIGS. 37 to 41, the lamellas 16 protruding outward from the inner sleeve 14 are fixed in a predetermined angular position by means of tools introduced at the end face. Once a first intermediate sleeve 18 has been slipped on, said first intermediate sleeve is welded to the free end edges of the lamellas 16 lying below it via a blind seam produced by means of a laser beam 30 (FIGS. 37 and 38). The first intermediate sleeve 18 is then provided with further lamellas 16. The lamellas 16 are positioned one after another and are joined to the intermediate sleeve 18 via a fillet weld produced by means of a laser beam 30k (FIG. 39). As described above, the lamellas 16 are once again fixed in a predetermined angular position by means of tools 34 introduced at the end face. Once a second intermediate sleeve 18 has been slipped on, said second intermediate sleeve is also welded to the free end edges of the lamellas 16 lying below it via a blind seam produced by means of a laser beam 30 (FIG. 40). The second intermediate sleeve 18 is then provided with further lamellas 16. The lamellas 16 are once again positioned one after another and are joined to the intermediate sleeve 18 via a fillet weld produced by means of a laser beam 30k (FIG. 41). One or more further intermediate sleeves 18 can be provided with corresponding lamellas 16 in an identical manner. A closing outer sleeve 12 can be positioned and joined, as described above, as the outermost sleeve of the cellular wheel in place of a further intermediate sleeve.

In FIGS. 42 to 50, yet another variant of the above-described production of a cellular wheel is described. The essential difference to the previously described types of production is that the sheet metal strip 26 provided with the lamellas 16 only on one side to form the inner sleeve 14 and the intermediate sleeve/sleeves 18 as well as a closing sheet metal strip 26 to form the outer sleeve 12, are rolled up one after the other directly onto the flange sleeve 15 or onto the free ends of the lamellas 16 of the sheet metal strip 26 already rolled up and lying below and during the rolling up are connected to the flange sleeve 15 or to the free ends of the lamellas 16.

Figure 42:
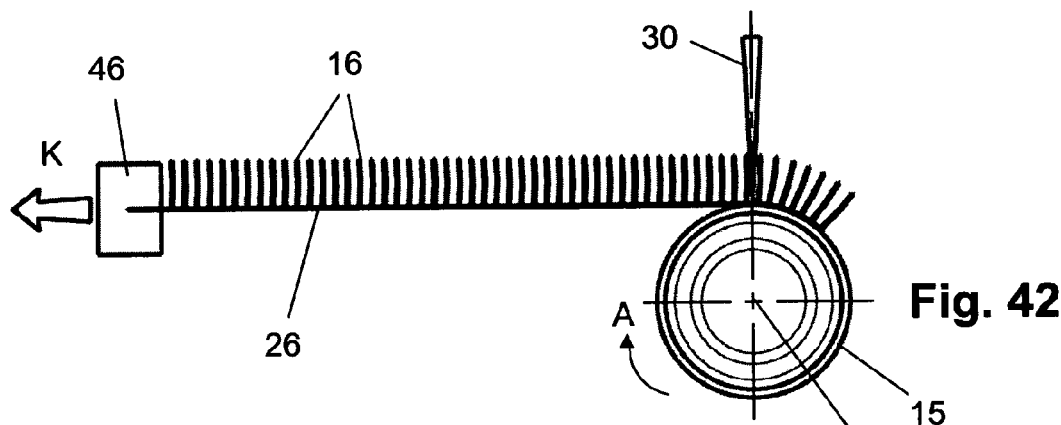
FIG. 42 shows a schematic representation of a side view of a flange sleeve when rolling up a planar sheet metal strip with lamellas secured thereon onto the flange sleeve.
Figure 43:
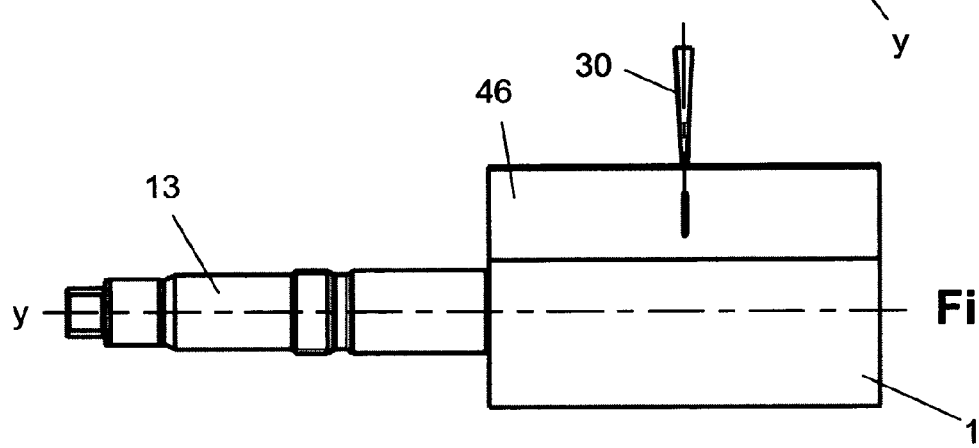
FIG. 43 shows a schematic representation of the front view of the arrangement in FIG. 42.
Figure 44:
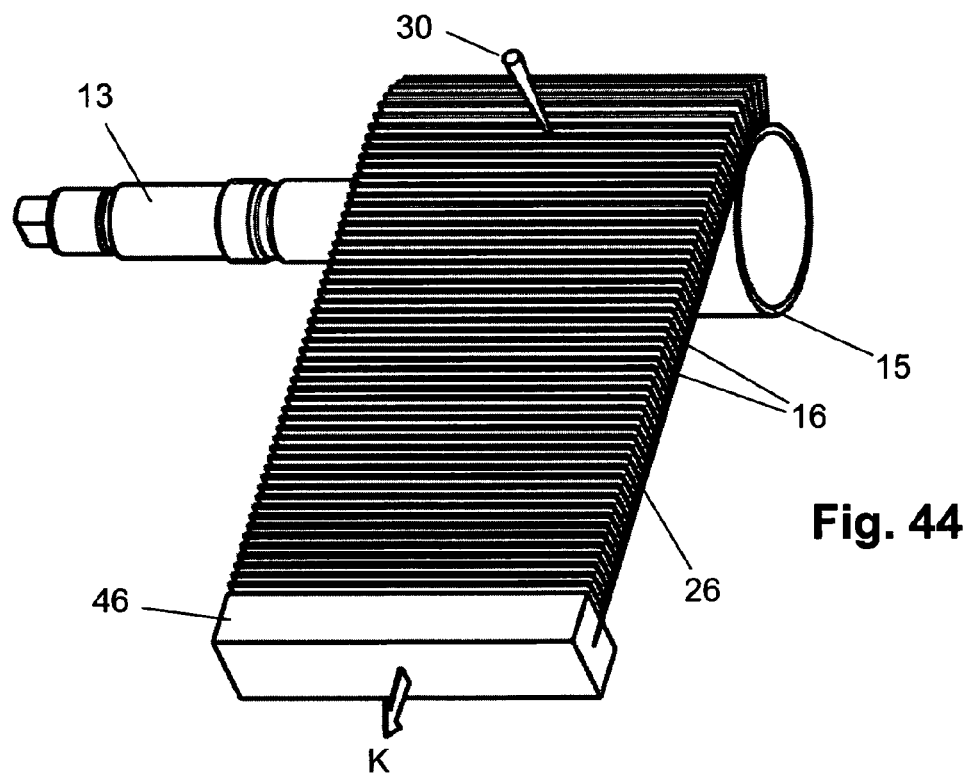
FIG. 44 shows a schematic representation of an inclined view from above onto the arrangement in FIG. 42.

As shown in FIGS. 42 to 44, one end of a first sheet metal strip 26, provided with lamellas 16 on one side and forming the inner sleeve 14 in the finished cellular wheel, is welded onto the flange sleeve 15 by means of a laser beam 30. The other end of the sheet metal strip 26 is clamped in a clamping device 46. The first sheet metal strip 26 fixed on one side to the flange sleeve 15 is impinged upon via the clamping device 46 with a tensile force K at right angles to the axis of rotation y of the flange sleeve 15 or of the cellular wheel and is tensioned such that, when the flange sleeve 15 is rotated about the axis of rotation y in the arrow direction A, the first sheet metal strip 26 provided with the lamellas 16 on one side is well set over the entire width at the site of the weld of the flange sleeve 15 to be performed. In principle, the welding of the sheet metal strip 26 to the flange sleeve 15 can be effected after, in each case, an identical number of lamellas 16, that is to say, for example, after every second or third lamella 16. However, the welding is preferably carried out between all the lamellas 16, i.e. the laser beam 30 guided parallel to the lamellas 16 moves between adjacent lamellas 16 parallel to the axis of rotation y in one direction over the width of the sheet metal strip 26 placed in position on the flange sleeve 15 and after pulsed rotation of the flange sleeve 15 by in each case an angular pitch that corresponds to the distance between lamellas, back in the opposite direction. After the final cut of the sheet metal strip 26 to the length that corresponds to the circumferential line of the flange sleeve 15, the end clamped up to then in the clamping device 46 is welded with the flange sleeve 15 and the two end face edges are welded with each other to form the inner sleeve 14.

Figure 45:
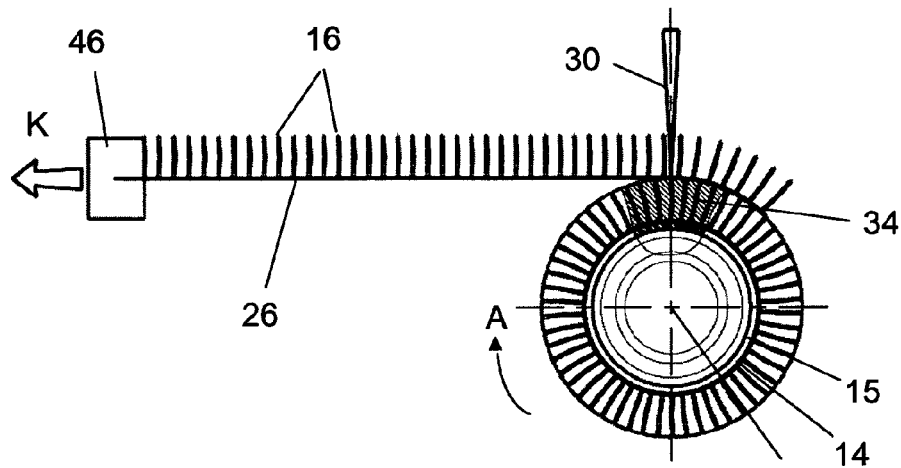
FIG. 45 shows a schematic representation of a side view corresponding to FIG. 42 when rolling up a second planar sheet metal strip with lamellas secured thereon onto the flange sleeve.
Figure 46:
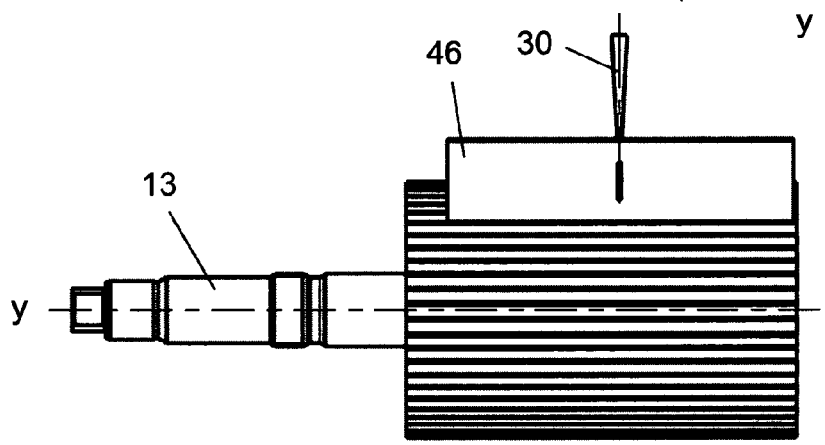
FIG. 46 shows a schematic representation of the front view of the arrangement in FIG. 45.
Figure 47:
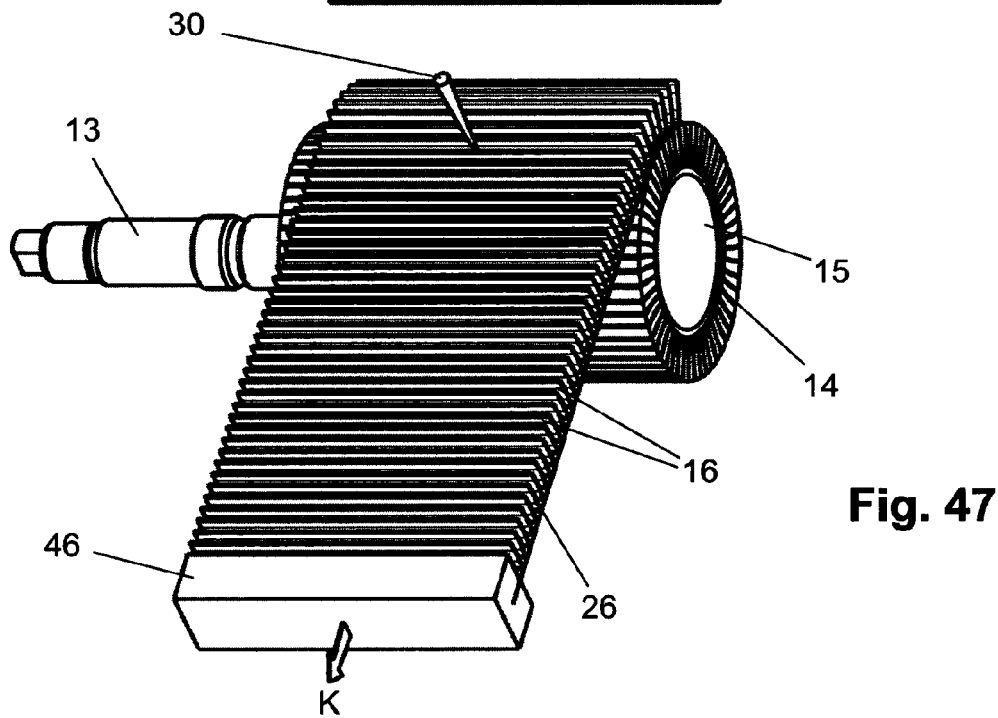
FIG. 47 shows a schematic representation of an inclined view from above onto the arrangement in FIG. 45.

As shown in FIGS. 45 to 47, one end of a second sheet metal strip 26 provided with lamellas 16 on one side and forming an intermediate sleeve 18 in the finished cellular wheel is welded by means of a laser beam 30 onto the free end of a lamella 16 of the first sheet metal strip 26 arranged on the flange sleeve 15. The other end of the second sheet metal strip 26 is clamped in the clamping device 46. The second sheet metal strip 26 fixed on one side to a free end of a first lamella 16 of the first sheet metal strip 26 is impinged upon via the clamping device 46 with a tensile force K at right angles to the axis of rotation y of the flange sleeve 15 or of the cellular wheel and is tensioned such that, when the flange sleeve 15 is rotated about the axis of rotation y in the arrow direction A, the second sheet metal strip 26 provided with the lamellas 16 on one side is well set over the entire length of the lamellas 16 at the site of the weld of the free ends of the lamellas 16 of the first sheet metal strip 26 to be performed. The laser beam 30 guided parallel to the lamellas 16 of the second sheet metal strip 26 moves between adjacent lamellas 16 parallel to the axis of rotation y in one direction over the width of the second sheet metal strip 26 placed in position on the free ends of the lamellas 16 of the first sheet metal strip 26 and after pulsed rotation of the flanged sleeve 15 by, in each case, an angular pitch that corresponds to the distance between lamellas, moves back in the opposite direction. In this way, all the lamellas 16 of the first sheet metal strip 26 are welded to the second sheet metal strip 26 lying thereon one after another via their free ends. After the final cut of the second sheet metal strip 26 to the length that corresponds to the circumferential line of the free ends of the lamellas 16 of the first sheet metal strip 26, the end clamped up to then in the clamping device 46 is welded to the last free ends of the lamellas 16 lying below it and the two end face edges are welded with each other to form the intermediate sleeve 18. Further intermediate sleeves 18 can be built-up in the above-described manner.

Figure 48:
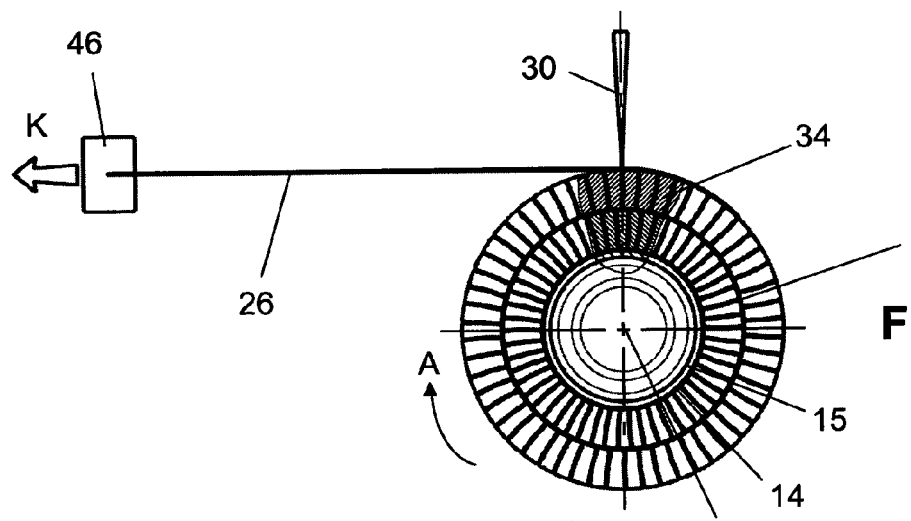
FIG. 48 shows a schematic representation of a side view corresponding to FIG. 45 when rolling up a third planar sheet metal strip.
Figure 49:
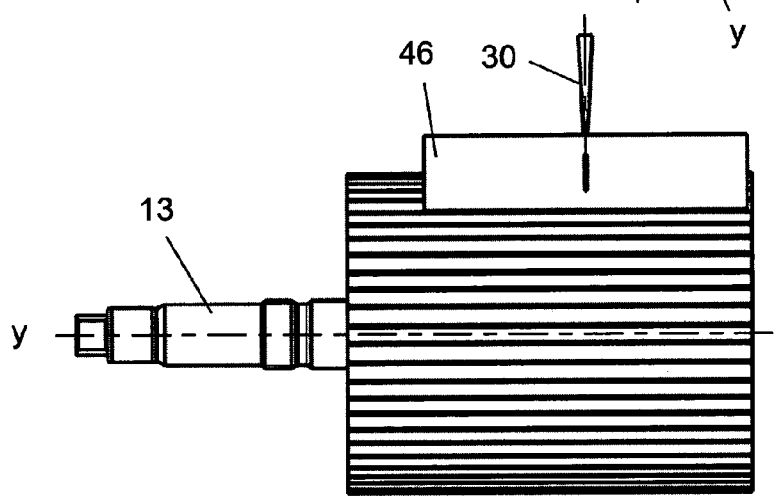
FIG. 49 shows a schematic representation of the front view of the arrangement in FIG. 48.
Figure 50:
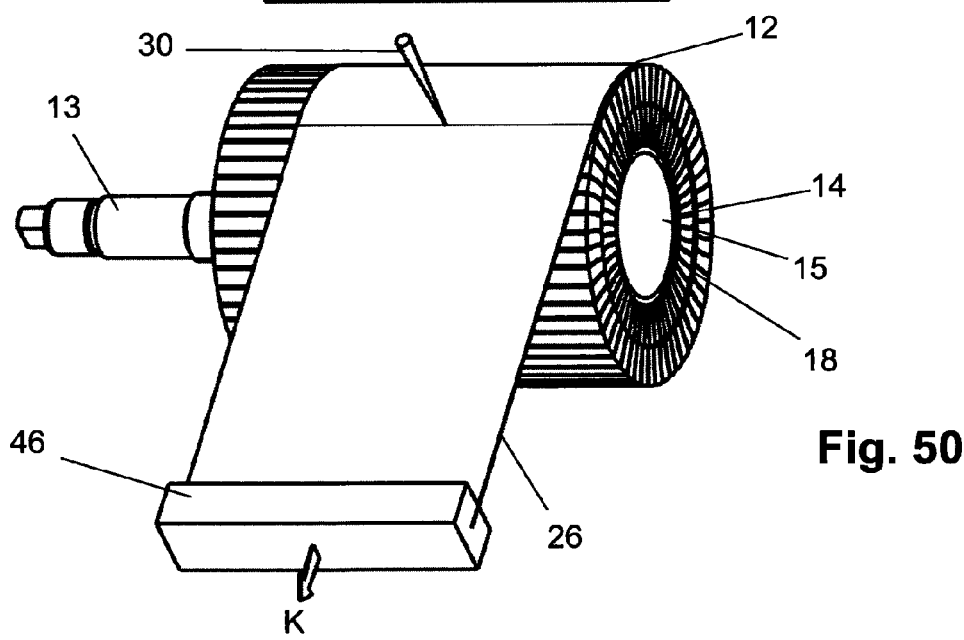
FIG. 50 shows a schematic representation of an inclined view from above onto the arrangement in FIG. 48.

As shown in FIGS. 48 to 50, one end of a third sheet metal strip 26 forming a closing outer sleeve 12 in the finished cellular wheel is welded by means of a laser beam 30 to the free end of a lamella 16 of the second sheet metal strip 26 lying below it. The other end of the third sheet metal strip 26 is clamped in the clamping device 46. The third sheet metal strip 26 fixed on one side to the free end of a first lamella 16 of the second sheet metal strip 26 is impinged upon via the clamping device 46 with a tensile force K at right angles to the axis of rotation y of the flange sleeve 15 or of the cellular wheel 10 and is tensioned such that, when the flange sleeve 15 is rotated about the axis of rotation y in the arrow direction A, the third sheet metal strip 26 is well set over the entire length of the lamellas 16 at the site of the weld of the free ends of the lamellas 16 of the second sheet metal strip 26 to be performed. The laser beam 30 guided parallel to the lamellas 16 of the second sheet metal strip 26 moves over the free ends of the lamellas 16 of the second sheet metal strip 26 parallel to the axis of rotation y in one direction over the width of the third sheet metal strip 26 placed in position on the free ends of the lamellas 16 of the second sheet metal strip 26 and after pulsed rotation of the flanged sleeve 15 by, in each case, an angular pitch that corresponds to the distance between lamellas, moves back in the opposite direction. In this way, all the lamellas 16 are welded to the third sheet metal strip 26 lying thereon one after another via their free ends. After the final cut of the third sheet metal strip 26 to the length that corresponds to the circumferential line of the free ends of the lamellas 16 of the second sheet metal strip 26, the end clamped up to then in the clamping device 46 is welded with the last free ends of the lamellas 16 lying below it and the two end face edges are welded with each other to form the outer sleeve 18.

Prior to the welding of the free ends to a sheet metal strip 26 lying thereon, the lamellas 16 protruding outward from the sheet metal strips 26 forming the inner sleeve 14 and the intermediate sleeve/sleeves, analogously to the arrangements shown in FIGS. 37 to 41, are fixed in a predetermined angular position via tools 34 introduced at the end face.

LIST OF REFERENCES

10 Cellular wheel
12 Outer sleeve
13 Drive shaft
14 Inner sleeve
15 Flange sleeve
16 Lamellas
17 Welding or soldering lug
18 Intermediate sleeve
20 Outer cells
22 Inner cells
24 Labyrinth seal part
26 Sheet metal part
27 Edge strip
28 Tongs
30,30',30",30k Laser beam
32, 32a Holders
33 Slot
34 Tool
35 Gap
36 Outer grinding roll
38 Inner grinding roll
39 Grinding roll gap
40 Tool
42 Holding-down device
43 Gap
44 Holding-down device
45 Gap
46 Clamping device
y Axis of rotation
K Tensile force

The invention claimed is:
1. A method for producing a cellular wheel made of metal, having a cylindrical outer sleeve that lies symmetrically with respect to an axis of rotation, a cylindrical inner sleeve that lies concentrically with respect to the outer sleeve, at least one cylindrical intermediate sleeve that is arranged between the outer sleeve and the inner sleeve concentrically with respect to said inner sleeve and said outer sleeve, wherein lamellas that are aligned radially in relation to the axis of rotation are arranged between the outer sleeve and an intermediate sleeve and between the intermediate sleeve and the inner sleeve, as well as in the case of there being more than one intermediate sleeve, between consecutive intermediate sleeves, the method comprising the following steps that are to be executed consecutively:
(a1) preparing a first sheet metal strip having two ends and a length that corresponds at least to a length of a circumferential line of the inner sleeve and having a width that corresponds at least to a length of the cellular wheel;
(b1) positioning the lamellas at predetermined locations in predetermined quantities on one side of the first sheet metal strip perpendicular to a surface of the first sheet metal strip and perpendicular to a longitudinal direction of the first sheet metal strip and connecting the lamellas to the first sheet metal strip by welding or soldering;
(c1) bending the first sheet metal strip provided on one side with the lamellas and connecting the two ends of the first sheet metal strip by welding or soldering to form the inner sleeve; or
(a2) preparing a first sheet metal strip having two ends and connecting the two ends of the first sheet metal strip by welding or soldering to form the inner sleeve, or prepare a tubular sleeve as inner sleeve;
(b2) positioning the lamellas at predetermined locations in predetermined quantities in axial planes on the outside of the inner sleeve;
(c2) connecting the lamellas to the inner sleeve by welding or soldering;
(d1) preparing a second sheet metal strip having two ends and a length that corresponds at least to a length of a circumferential line of a first intermediate sleeve and having a width that corresponds at least to the length of the cellular wheel;
(e1) positioning the lamellas at predetermined locations in predetermined quantities on one side of the second sheet metal strip perpendicular to a surface of the second sheet metal strip and perpendicular to a longitudinal direction of the second sheet metal strip and connecting the lamellas to the second sheet metal strip by welding or soldering;
(f1) bending the second sheet metal strip provided with lamellas on one side and connecting the two ends of the second sheet metal strip by welding or soldering to form the first intermediate sleeve (18); or
(d2) preparing a second sheet metal strip having two ends and connecting the two ends of the second sheet metal strip by welding or soldering to form the first intermediate sleeve, or preparing a tubular sleeve as an intermediate sleeve;

(e2) positioning the lamellas at predetermined locations in predetermined quantities in axial planes on an outside of the first intermediate sleeve;

(f2) connecting the lamellas to the first intermediate sleeve by welding or soldering;

(g) positioning the first intermediate sleeve and connect free ends of the lamellas of the inner sleeve to the first intermediate sleeve by welding or soldering;

(h) where applicable, repeating steps (d1)-(f1) or (d2)-(f2) to form at least one further intermediate sleeve and connecting the free ends of the lamellas of the first intermediate sleeve to the second intermediate sleeve, and in the case of there being more than two intermediate sleeves, connecting the free ends of the lamellas of each preceding intermediate sleeve to the subsequent intermediate sleeve by welding or soldering; and (i) positioning a tubular sleeve that is concentric to the intermediate sleeves as the outer sleeve and connecting the free ends of the lamellas of an outermost intermediate sleeve to the outer sleeve by welding or soldering.

2. The method as claimed in claim 1, characterized in that prior to positioning the outer sleeve, the inner sleeve and the intermediate sleeve/sleeves, the free ends of the lamellas are removed by means of grinding rolls until the free ends of the lamellas are lying on a lateral cylinder surface that corresponds to an inside of the outer sleeve, an outside of the inner sleeve or an inside of the intermediate sleeve/sleeves (18).

3. The method as claimed in claim 1, characterized in that the connecting of the lamellas to the first sheet metal strip, to the outer sleeve, to the inner sleeve and/or to the intermediate sleeve is carried out by soldering the parts via a soldering lug in the form of a folded-over edge strip, which extends over a length of the lamellas and is coated by a solder.

4. The method as claimed in claim 1, characterized in that the connecting of the lamellas to the first or second sheet metal strips, to the outer sleeve, to the inner sleeve and/or to the intermediate sleeve is carried out by welding the parts by means of a laser or electron beam.

5. The method as claimed in claim 1, characterized in that the positioning of the lamellas onto the first or second sheet metal strip is carried out by means of a numerically-controlled clamping device.

6. The method as claimed in claim 1, characterized in that the first or second sheet metal strip is tensioned in a curved manner for the positioning of the lamellas and connecting to the first or second sheet metal strip and the positioning of the lamellas is carried out on the side of the first or second sheet metal strip with a convex curvature.

7. The method as claimed in claim 1, characterized in that a wall thickness of materials used to produce the cellular wheel is less than 0.5 mm.

8. The method as claimed in claim 7, characterized in that a wall thickness of materials used to produce the cellular wheel is a maximum of 0.2 mm.

9. The method for producing a cellular wheel made of metal, having a cylindrical outer sleeve that lies symmetrically with respect to an axis of rotation, a cylindrical inner sleeve that lies concentrically with respect to the outer sleeve, a cylindrical intermediate sleeve that is arranged between the outer sleeve and the inner sleeve concentrically with respect to said inner sleeve and outer sleeve, wherein lamellas that are aligned radially in relation to the axis of rotation are arranged between the outer sleeve and the intermediate sleeve and between the intermediate sleeve (18) and the inner sleeve (14), the method comprising the following steps that are to be executed consecutively:

(a) preparing a sheet metal strip having two ends and a length that corresponds at least to a length of a circumferential line of the intermediate sleeve and having a width that corresponds at least to a length of the cellular wheel;

(b) positioning the lamellas at predetermined locations in predetermined quantities on both sides of the sheet metal strip perpendicular to a surface of the sheet metal strip and perpendicular to a longitudinal direction of the sheet metal strip and connecting the lamellas to the sheet metal strip by welding or soldering;

(c) bending the sheet metal strip provided on both sides with the lamellas and connecting the two ends of the sheet metal strip by welding or soldering to form the inner sleeve;

(d) positioning a first tubular sleeve that is concentric to the intermediate sleeve as the outer sleeve and a second tubular sleeve that is concentric to the intermediate sleeve as the inner sleeve and connecting free ends of the lamellas to the outer sleeve or the inner sleeve by welding or soldering.

10. A method for producing a cellular wheel made of metal, having a cylindrical outer sleeve that lies symmetrically with respect to an axis of rotation, a cylindrical inner sleeve that lies concentrically with respect to the outer sleeve and is arranged on a cylindrical flange sleeve, at least one cylindrical intermediate sleeve that is arranged between the outer sleeve and the inner sleeve concentrically with respect to said sleeves, wherein lamellas that are aligned radially in relation to the axis of rotation are arranged between the outer sleeve and the intermediate sleeve and between the intermediate sleeve and the inner sleeve, as well as, in the case of there being more than one intermediate sleeve, between consecutive intermediate sleeves, the method comprising the following steps that are to be executed consecutively:

(a) preparing a first sheet metal strip having a length that corresponds at least to a length of a circumferential line of the inner sleeve and having a width that corresponds at least to a length of the cellular wheel;

(b) positioning the lamellas at predetermined locations in predetermined quantities on one side of the first sheet metal strip perpendicular to a surface of the sheet metal strip and perpendicular to a longitudinal direction of the first sheet metal strip and connecting the lamellas (16) to the first sheet metal strip by welding or soldering;

(c) connecting a first end of the first sheet metal strip provided on one side with the lamellas to a flange sleeve by welding or soldering, and rolling up the first sheet metal strip onto the flange sleeve, wherein, proceeding from the first end connected to the flange sleeve, the first sheet metal strip is connected at regular intervals to the flange sleeve by welding or soldering to form the inner sleeve;

(d) preparing a second sheet metal strip having a length that corresponds at least to a length of a circumferential line of the first intermediate sleeve and having a width that corresponds at least to the length of the cellular wheel;

(e) positioning the lamellas at predetermined locations in predetermined quantities on one side of the second sheet metal strip perpendicular to the sheet metal surface and perpendicular to the longitudinal direction of the second sheet metal strip and connecting the lamellas to the second sheet metal strip by welding or soldering;

(f) connecting a first end of the second sheet metal strip provided on one side with the lamellas to a free end of a first lamella of the first sheet metal strip forming the inner sleeve by welding or soldering, and rolling up the second sheet metal strip onto the free ends of the lamellas of the inner sleeve, wherein, proceeding from a first end connected to the free end of the first lamella of the inner sleeve, the second sheet metal strip is connected at regular intervals to free ends of the lamellas of the inner sleeve by welding or soldering to form the first intermediate sleeve;

(g) where applicable, repeating steps (d)-(f) to form at least one further intermediate sleeve and connecting the free ends of the lamellas of the first intermediate sleeve to the second intermediate sleeve, and in the case of there being more than two intermediate sleeves connecting the free ends of the lamellas of each preceding intermediate sleeve to the following intermediate sleeve by welding or soldering;

(h) preparing a third sheet metal strip having a length that corresponds at least to a length of a circumferential line of the outer sleeve and having a width that corresponds at least to the length of the cellular wheel;

(i) connecting a first end of the third sheet metal strip to a free end of a first lamella of the first sheet metal strip forming the outermost intermediate sleeve by welding or soldering, and rolling up the third sheet metal strip onto the free ends of the lamellas the outermost intermediate sleeve, wherein, proceeding from the first end connected to the free end of the first lamella of the outermost intermediate sleeve, the third sheet metal strip is connected at regular intervals to the free ends of the lamellas of the outermost intermediate sleeve by welding or soldering to form the outer sleeve.

* * * * *